2,961,324

MEAT CONDITIONING COMPOSITION

William O. Fraesdorf, Jr., 2253 N. Norris Ave., Tucson, Ariz.

No Drawing. Filed May 29, 1957, Ser. No. 662,318

2 Claims. (Cl. 99—222)

My invention relates to an improved method of conditioning meat, particularly beef, intended for frying or broiling. It relates also to an improved preparation for treating and conditioning meats and other protein substances preparatory to or in the process of cooking them.

Ferment-containing preparations, used generally in cooking but having their principal application in the treatment of beef before broiling, have been available on the market for a number of years. The active ingredient, and sometimes the only ingredient, of such known preparations is a proteolytic enzyme, commonly papain. The extracted juice of the papaya plant or fruit is sometimes employed as such.

While preparations of the character described do have a distinct tenderizing effect on meats because of the digestive action of the enzymes present, the surface action of the preparation, whether relatively brief or long continued, causes the meat to become pulpy. The resulting meat product after treatment no longer has the initial cell structure, its appearance and physical character are changed and vary from surface to center, and the chewing quality of the cooked meat is distinctly impaired. If a piece of beef is left in a solution formed by dissolving a dry preparation "tenderizer" in water for a sufficient length of time—as short a time as two hours, for example—the beef will be completely disintegrated. Nor is the deleterious "pulping" action of tenderizer preparations controllable by dilution of the preparation or shortening the time of contact. Even a weak solution of a proteolytic enzyme will completely disintegrate a piece of meat if enough time is allowed. Permitting the action to continue short of time required to produce pulpiness in the meat is not effective because no tenderizing action is obtained. In other words, regardless of the manner of use of preparations of the prior art, tenderizing action and pulping action on the meat are concomitant.

The principal object of my invention is the provision of an improved preparation of the type commonly called meat tenderizers.

Another object is to provide an improved method of conditioning beef and the like so that cuts not normally employed for broiling may be used to advantage.

Still another object is to provide a method of and preparation for tenderizing beef and the like without causing pulpiness in the treated protein product.

A further and more specific object of the invention is to control the action of a proteolytic enzyme when used in a meat tenderizing preparation.

In general I secure the objects of the present invention by treating meat and other protein products with a solution or aqueous dispersion of a proteolytic enzyme of animal or vegetable origin and a controlling agent comprising a somewhat greater proportion of a protein product of vegetable or animal origin, preferably at least partially hydrolyzed, and optionally a salt of glutamic acid such as mono sodium glutamate. Preferably the solute material is prepared in the form of mixed pulverulent materials such as one part of a powdered enzyme preparation, four to about twenty-five parts of a mixture of hydrolyzed vegetable and animal protein, and one to about six parts of mono sodium glutamate. Other ingredients commonly used in tenderizer preparations may be included such as salt, various condiments such as spices and flavoring, and the like. In general, however, I prefer not to include substances having a seasoning action, depending rather on the user of my improved preparation to select his own seasoning.

The conditioning product of my invention is preferably vended as a dry mixture of its essential ingredients, and the dry mixture dissolved in water prior to use. The protein to be conditioned is then wetted down with the resulting solution. One method is to use a shallow dish, pour the liquid into the shallow dish and add the meat, forking it slightly to assist in penetration of the conditioning solution, and turning the meat over at least once so that its entire surface will be wetted by the solution. Five to ten minutes' treatment is usually adequate, although long continued treatment will have no deleterious result. The treated and conditioned meat may be broiled immediately, stored for several hours in a refrigerator before cooking, or frozen and kept for several days. The solution does not have to be removed before long storage of the meat as there is no long-continuing action such as characterizes "tenderizers" of the prior art.

Substantially any active proteolytic enzyme may be used, such as trypsin, pepsin and other common enzymes of animal origin, and commonly known enzymes of vegetable origin such as papain, ficin (from figs), bromelin (from pineapple), asclepain (from mildweed latex), arachain (from peanuts), and the mixed proteases present in ripened grains. All of the above enzymes are of the protease type and are active on the entire protein molecule, and this class of substance is preferred. Enzymes which are effective only on peptides are not so effective except as they may be present in a plant extract containing the desirable protease. Proteolytic enzymes from yeast can be effective. The preferred enzymic agent, however, is papain because of its availability, its relatively small cost, and its other distinctly advantageous properties. Moreover, a highly pure papain product is not required. The commercially available dry extracts of papaya juice containing substantial proportions of active papain are excellent for my purpose. When reference is made herein, or in the claims, to papain it should be understood to include the highly purified enzyme or a dried commercial extract such as formed from the juice of the papaya melon or pawpaw containing substantial amounts of active papain.

One specific example of the manner of practicing my invention is to prepare a dry mixture of one part of powdered commercial papain, twelve parts of a commercial pulverulent mixture of about equal parts of hydrolyzed vegetable protein and animal protein, and four parts of mono sodium glutamate. A suitable commercial protein preparation is one sold on the commercial market for making "beef bouillon." Such product may be purchased in solid frangible form or comminuted; and while they sometimes also contain flavoring and other additives, the latter are present in such small proportions as not to preclude use of the product.

The mixture so prepared may be kept indefinitely. When meat is to be treated, up to about one ounce but preferably about half an ounce of the mixture is dissolved in warm to hot water. It is allowed to stand five to ten minutes and poured into a shallow pan. Slices of beef tenderloin tip, for example, of a size for broiling are placed in the shallow pan and turned over to wet them with the solution on both sides. A fork may be used to pierce the meat slices. This assists in the penetration of the solution and serves to test the character of the meat. About ten minutes' treatment is usually sufficient. The beef tenderloin tip slices are then broiled, and when completed have all the tenderness and chewing characteristics of the best steak cuts of the choicest beef. Beef tenderloin tips are known to have a good flavor, but normally they are not suitable for broiling. The process and product of my invention make them entirely suitable.

In another example of the practice of my invention I prepared a powdered beef product by sun-drying strips of beef (making the product known as "jerky") and powdered the resulting product, removing sinew and other stringy or not readily powdered portions. The resulting product was mixed with commercial powdered papain in proportion of ten parts to one, and two parts of mono sodium glutamate for each part of papain were added. This product dispersed in hot water and allowed to stand for ten to fifteen minutes has the effect of markedly improving the character of relatively inexpensive cuts of beef as to tenderness, chewiness, flavor and the like. The same manner of treating the meat as described in the first example is used.

The mixture described, whether used in dry form or as a solution or dispersion, has many uses in cooking other than in the conditioning of beefsteak. A teaspoonful of the powdered mixture has a tenderizing and enhancing action when introduced into a stew. It also reduces the required cooking time. A quarter teaspoonful added to cooking peas or beans reduces cooking time and produces a more tender and flavorful end product. Poultry can be prepared for broiling, frying or stewing by wetting the surface with the solution, and markedly improved results are obtained.

I am unable to explain the favorable action of my improved method and product. The effect of the material added to the enzyme is definitely not that of mere dilution. Very extensive dilution of the enzyme with water does not avoid the pulping and side effects on the meat resulting from using such enzyme in normal recommended concentrations. The protein products added to the enzyme apparently have either a buffer type action, serve to modify the enzyme in some manner, or possibly form a loose chemical bond with the enzyme. It may be that some other action entirely is the cause. While the powdered mixture of my invention may be sprinkled directly on the meat surface, it does not function in exactly the same way as when first dissolved in water. Proteolytic enzymes are themselves proteins, and some interaction between the enzymes and proteins in solution appears to take place. As pointed out, hydrolyzed proteins are most effective, and a mixture of vegetable and animal origins of hydrolyzed proteins seems to produce the best results of all. While such materials as gelatin, dried powdered egg whites and the like can be used, they also are not as effective in the mixture as the mixed hydrolyzed vegetable and animal proteins. Mono sodium glutamate is most effective in the mixture. I am aware that this product has been used in cooking to develop flavor, but while it does have have some such action in the product of my invention, it participates in controlling and attenuating the enzyme action such as to prevent the development of a pulpy product. Glutamic acid is of course an amino acid, and this may explain the conjoint action with the hydrolyzed protein and protease which does occur. It appears from experiment, also, that if mono sodium glutamate is deleted, the best results are obtained by increasing the proportion of hydrolyzed protein used.

The proportion of the ingredients may, of course, be modified as contrasted with the relative quantities shown in the specific examples. For one part of proteolytic enzyme on a dry basis, from about six to about twenty-four parts of hydrolyzed proteins may be employed, and from about two parts to about six parts of mono sodium glutamate.

I have described my invention in detail so that those skilled in the art will understand the best manner of practicing the same, but the scope of the invention is limited only by the appended claims.

I claim:

1. A meat conditioner comprising a dry mixture adapted for dispersion in water for treatment of the meat, said dry mixture consisting of papain one part, hydrolyzed proteins of vegetable and animal origin twelve parts, and mono sodium glutamate four parts.

2. A meat conditioner comprising a dry mixture adapted to be dispersed in water for the treatment of meat, said dry mixture consisting of ten to twelve parts of hydrolyzed animal and vegetable protein and one part of papain.

References Cited in the file of this patent

UNITED STATES PATENTS

| | | |
|---|---|---|
| 2,072,955 | Lunt | Mar. 9, 1937 |
| 2,140,781 | Allen | Dec. 20, 1938 |
| 2,464,200 | Hall | Mar. 15, 1949 |
| 2,774,673 | Young | Dec. 18, 1956 |